C=US009444559B2

(12) United States Patent
Jiang et al.

(10) Patent No.: US 9,444,559 B2
(45) Date of Patent: Sep. 13, 2016

(54) SECOND ORDER INTERCEPT POINT (IP2) CALIBRATION FOR WIRELESS RECEIVERS

(71) Applicant: FutureWei Technologies, Inc., Plano, TX (US)

(72) Inventors: Hong Jiang, Kernersville, NC (US); Zhihang Zhang, Cary, NC (US); Jian Liang, Greensboro, NC (US)

(73) Assignee: Futurewei Technologies, Inc., Plano, TX (US)

( * ) Notice: Subject to any disclaimer, the term of this patent is extended or adjusted under 35 U.S.C. 154(b) by 133 days.

(21) Appl. No.: 13/908,925

(22) Filed: Jun. 3, 2013

(65) Prior Publication Data

US 2014/0355456 A1   Dec. 4, 2014

(51) Int. Cl.
| | |
|---|---|
| *H04B 17/00* | (2015.01) |
| *H04B 17/21* | (2015.01) |
| *H04B 17/14* | (2015.01) |

(52) U.S. Cl.
CPC .......... *H04B 17/00* (2013.01); *H04B 17/0085* (2013.01); *H04B 17/14* (2015.01); *H04B 17/21* (2015.01)

(58) Field of Classification Search
None
See application file for complete search history.

(56) References Cited

U.S. PATENT DOCUMENTS

| | | | |
|---|---|---|---|
| 6,236,839 B1 * | 5/2001 | Gu | H01Q 3/267 342/359 |
| 8,060,043 B2 | 11/2011 | Pratt et al. | |
| 8,121,571 B2 | 2/2012 | Kushnir et al. | |
| 8,238,860 B2 | 8/2012 | Sobchak et al. | |
| 8,676,145 B2 * | 3/2014 | Kaczman et al. | 455/313 |
| 2009/0068963 A1 * | 3/2009 | Cabanillas et al. | 455/83 |
| 2009/0186587 A1 * | 7/2009 | Sobchak et al. | 455/196.1 |
| 2009/0202022 A1 * | 8/2009 | Kaczman | H04L 27/3872 375/319 |
| 2009/0227214 A1 * | 9/2009 | Georgantas | H04B 1/30 455/86 |
| 2010/0093298 A1 | 4/2010 | Pratt et al. | |
| 2011/0128992 A1 * | 6/2011 | Maeda | H04B 17/0085 375/130 |
| 2011/0151792 A1 * | 6/2011 | Kushnir et al. | 455/63.1 |
| 2011/0195673 A1 * | 8/2011 | Pratt et al. | 455/78 |
| 2011/0299575 A1 | 12/2011 | Ali et al. | |
| 2012/0077452 A1 | 3/2012 | Dufréne et al. | |
| 2013/0049780 A1 * | 2/2013 | Collins et al. | 324/750.3 |
| 2014/0049326 A1 * | 2/2014 | Rodal | 330/299 |
| 2014/0092946 A1 * | 4/2014 | Dhayni et al. | 375/224 |

FOREIGN PATENT DOCUMENTS

| | | |
|---|---|---|
| CN | 102217202 A | 10/2011 |
| CN | 102246423 A | 11/2011 |
| CN | 102420622 A | 4/2012 |

OTHER PUBLICATIONS

Patent Coorperation Treaty International Search Report Received in International Application No. PCT/CN2014/079035, Mailed Sep. 9, 2014, 12 pages.

\* cited by examiner

*Primary Examiner* — Noel Beharry
*Assistant Examiner* — Wilfred Thomas
(74) *Attorney, Agent, or Firm* — Slater Matsil, LLP

(57) ABSTRACT

IP2 calibration efficiency can be improved by passing the calibration signal through the transceiver's duplexer instead of inserting the calibration signal directly onto transceivers receive circuit. Passing the calibration signal through the duplexer may reduce IP2 calibration periods for transceivers having less-permeable duplexers, or duplexers that provide better than average separation between the RX and TX circuits. IP2 calibration inefficiencies can also be reduced by using a binary-like search when computing the in-phase and quadrature-phase path correction coefficients of the IP2 correction code.

20 Claims, 20 Drawing Sheets

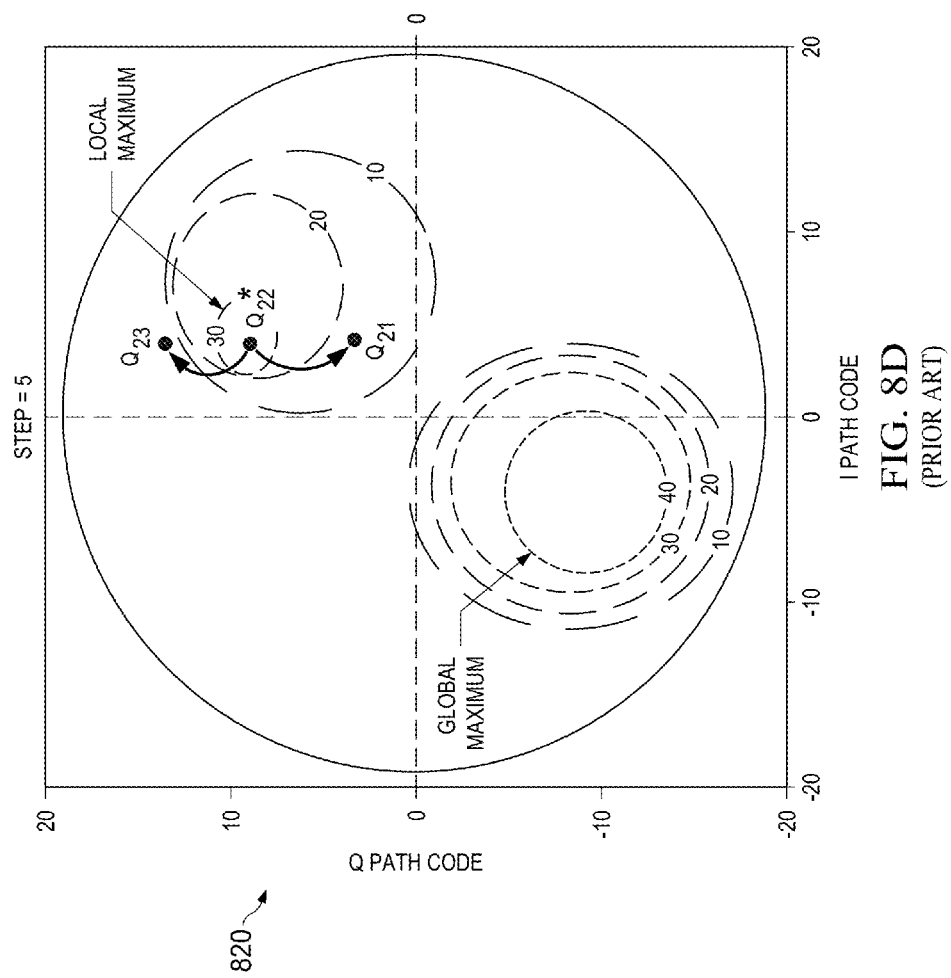

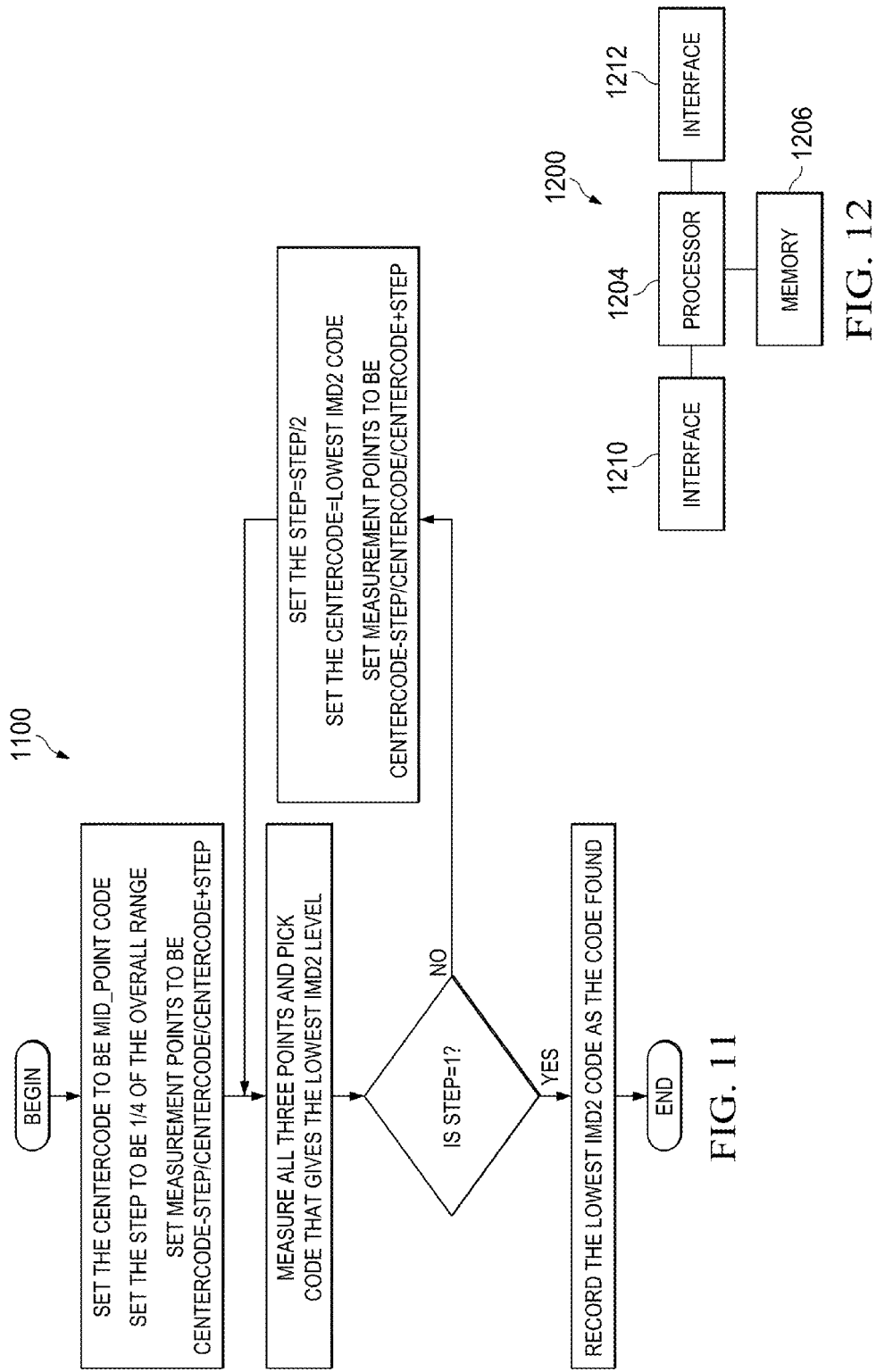

SECOND ORDER INTERCEPT POINT (IP2) CALIBRATION FOR WIRELESS RECEIVERS

TECHNICAL FIELD

The present invention relates generally to wireless communications, and, in certain embodiments, to an apparatus and method for second order intercept point (IP2) calibration for wireless receivers.

BACKGROUND

Second order intercept point (IP2) calibration is typically performed on transceivers to mitigate the effects of second-order inter modulation distortion (IMD2), which occurs when portions of a transmit signal leak across the duplexer into the receive (RX) circuit. Factory IP2 calibration is a time-consuming and costly procedure. Accordingly, mechanisms and techniques for making IP2 calibration more efficient are desired.

SUMMARY OF THE INVENTION

Technical advantages are generally achieved, by embodiments of this disclosure which describe an apparatus and method for performing second order intercept point (IP2) calibration in wireless receivers.

In accordance with an embodiment, a method for second order intercept point (IP2) calibration is provided. In this example, the method includes transmitting a calibration signal over a transmit port of a duplexer. The duplexer comprises a receive port coupled to a receive circuit of a transceiver, and a portion of the calibration signal leaks across the receive port of the duplexer and propagates over the receive circuit. The method further includes analyzing the portion of the calibration signal to determine IP2 calibration parameters for the receive circuit of the transceiver. An apparatus for performing this method is also provided.

In accordance with another embodiment, another method for second order intercept point (IP2) calibration is provided. In this example, the method includes receiving a calibration signal comprising second order intermodulation distortion (IMD2), determining an in-phase correction (I-correction) of an IP2 correction code by examining multiple sets of I-correction values on a fixed quadrature-phase path (Q-path). Each of the multiple sets of I-correction values are associated with a different step size. The method further includes determining a quadrature-phase correction (Q-correction) of the IP2 correction code in accordance with the correction of the IP2 correction code. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which:

FIGS. 8A-8F illustrate diagrams of component searches during a strict binary search;

FIG. 11 illustrates a flowchart of an embodiment method for performing a component search during an embodiment binary-like search; and FIG. 12 illustrates a block diagram of an embodiment communications device.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
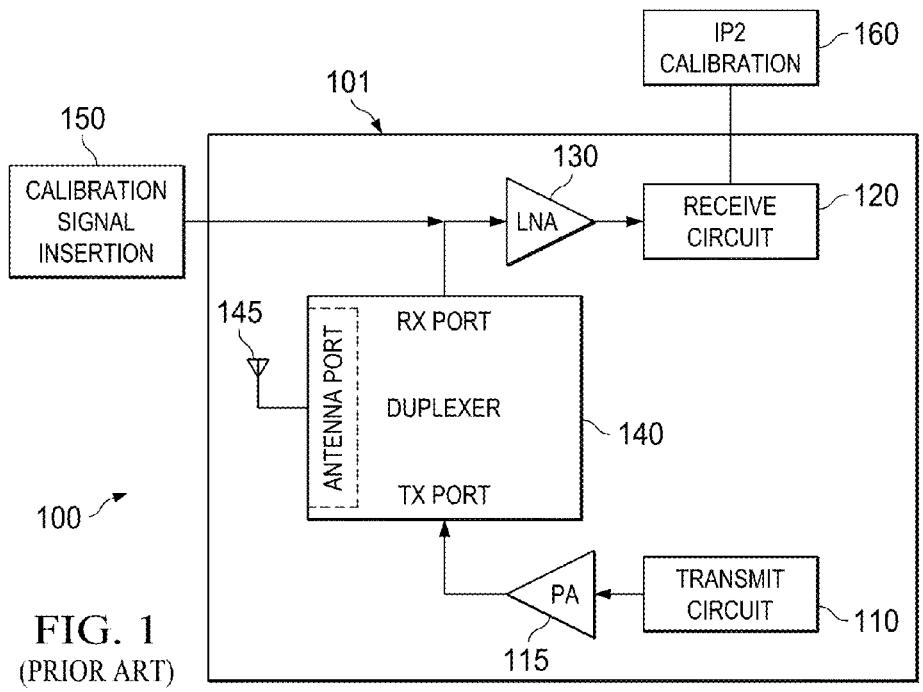
FIG. 1 illustrates a diagram of a conventional IP2 calibration architecture.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Factory IP2 calibration is achieved by analyzing a calibration signal that has propagated across an RX circuit in order to determine an IP2 correction code. Conventional IP2 calibration schemes insert the IP2 calibration signal directly onto the input path of the RX circuit using dedicated equipment and/or circuitry, thereby bypassing the duplexer that isolates the RX circuit from the transmit (TX) circuit. While this approach reliably calibrates the RX circuit, its practice of bypassing the duplexer effectively ignores the duplexer's ability to block/filter at least some of the transmit signal during practical operation. As a result, the RX circuit is often calibrated to a greater extent than is necessary to achieve adequate reception performance, which introduces in-efficiencies into the factory calibration process, e.g., longer calibration times, more failed components, etc.

Aspects of this disclosure avoid these inefficiencies by passing the IP2 calibration signal through the duplexer, which reduces calibration time/costs by, inter alia, accounting for the non-ideal performance characteristics of the duplexer. By way of example, transceivers having less-permeable duplexers (e.g., duplexers that provide better than average separation between the RX and TX circuits) may require less IP2 calibration than those having more-permeable duplexers.

Another inefficiency associated conventional factory IP2 calibration arises from its reliance on a strict binary search. More specifically, the strict binary search evaluates a single set of points (i.e., three points: a low point; a mid-point; and a high point) for each in-phase component (I-component) search and quadrature-phase component (Q-component) search during a given search iteration in the IP2 calibration, as well as decrements the step value (i.e., the distance in-between evaluation points) in-between consecutive iterations. This causes the conventional IP2 calibration to become susceptible to finding a local maximum, rather than a global maximum, which may result in a more component failures (e.g., components that are incapable of achieving adequate calibration) as well as extended calibrations period. Aspects of this disclosure provide a binary-like search, which evaluates multiple sets of points (e.g., more than three points) for I-component and Q-component searches in the first iteration of IP2 calibration, and thereafter proceeds to reduce the number of evaluated point sets for successive iterations. The evaluation of multiple sets during the first iterations reduces the likelihood that the IP2 search will get stuck in a local maximum. An additional caveat includes halting the IP2 search upon determining that an intermediate IP2 correction code (e.g., I-correction, Q-correction) selected during intermediate iterations satisfies an IMD2 performance threshold. This may reduce calibration time by reducing the average number of iterations performed during IP2 calibration. Details regarding the binary-like search are provided in greater detail below in various portions of this disclosure, including those portions related to FIGS. 8-12.

FIG. 1 illustrates a conventional IP2 calibration architecture 100, as may commonly be used to calibrate transceivers in a factory setting. As shown, the conventional IP2 calibration architecture 100 includes a transceiver 101 and a calibration signal insertion module 150. The transceiver 101 includes a transmit circuit 110, a power amplifier (PA) 115, a receive circuit 120, a low noise amplifier (LNA) 130, a duplexer 140, and an antenna 145. The transmit circuit 110 may be configured to generate a transmission signal, and may include any collection of components (e.g., digital to analog converter (DAC), modulators, frequency oscillators, etc.) for achieving that purpose. The PA 115 may be configured to amplify the transmission signal generated by the transmit circuit 110. The receive circuit 120 may be configured to process a received signal, and may include any collection of components (e.g., analog to digital converter (ADC), demodulator, frequency oscillators, etc.) for achieving that purpose. The LNA 130 may be any component configured to amplify a received signal prior to forwarding it to the receive circuit 120. The duplexer 140 may be any component configured to allow bi-directional (duplexed) communication over a single path, and may isolate the transmit circuit 110 from the receive circuit 120. The antenna 145 may be any component configured to emit and receive wireless transmissions.

Calibration of the receive circuit 120 may be collectively performed by the calibration signal insertion module 150 and the IP2 calibration module 160. More specifically, the calibration signal insertion module 150 may be configured to insert an IP2 calibration signal into the receive circuit 120, while the IP2 calibration module 160 may be configured to analyze the calibration signal after it propagates through the receive circuit 120 to determine IP2 correction code. As shown, the calibration signal insertion module 150 inserts the IP2 calibration signal directly onto the receive path of the transceiver 101, thereby circumventing the duplexer 140. As a result, the receive circuit 120 is often calibrated to a greater extent than is necessary to achieve adequate reception performance, which introduces inefficiencies into the factory calibration process, e.g., longer calibration times, more failed components, etc.

Figure 2:
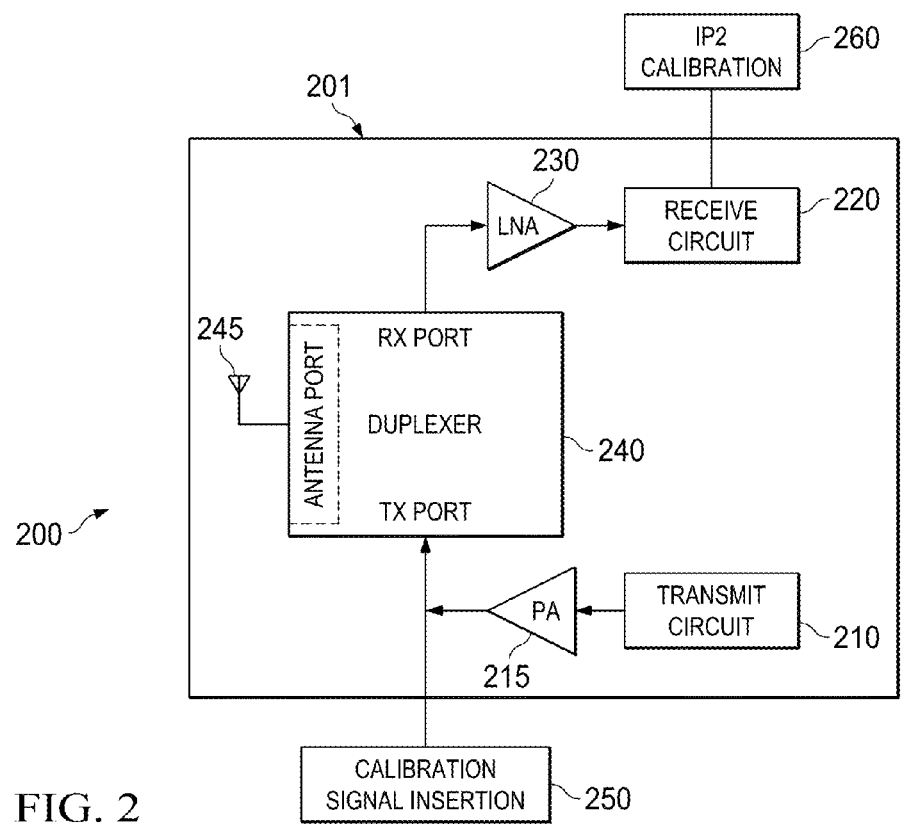
FIG. 2 illustrates a diagram of an embodiment IP2 calibration architecture.

Aspects of this disclosure insert the IP2 calibration signal onto the transmit port of a duplexer, which reduces calibration time/costs by accounting for the non-ideal performance characteristics of the duplexer. FIG. 2 illustrates an embodiment IP2 calibration architecture 200 including a transceiver 201, a calibration signal insertion module 250, and an IP2 calibration module 260. The transceiver 201 includes a transmit circuit 210, a PA 215, a receive circuit 220, an LNA 230, a duplexer 240, and an antenna 245, which may be configured similarly to like components of the transceiver 101. As shown, the calibration signal insertion module 250 is configured to insert the IP2 calibration signal onto the transmit port of the duplexer 240, thereby allowing the duplexer 240 to filter out or otherwise block at least a portion of the IP2 calibration signal, e.g., in a manner similar to that which would occur during normal operation. A portion of the IP2 calibration signal will leak from the transmit port to the receive port of the duplexer 240. The degree in which the IP2 calibration signal leaks across the respective ports may depend on the permeability of duplexer 240, which will vary from one duplexer component to another. The IP2 calibration module 260 is configured to analyze the leaked portion of the IP2 calibration signal, and to calibrate the receive circuit 260 in accordance therewith. Accordingly, the embodiment IP2 calibration architecture 200 more closely resembles actual transceiver operation than the conventional IP2 calibration architecture 100, and therefore allows for more efficient IP2 calibration.

Figure 3:
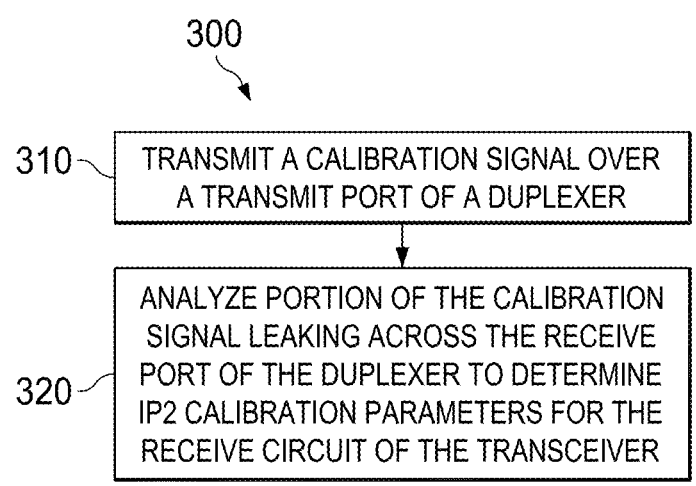
FIG. 3 illustrates a flowchart of an embodiment method for performing IP2 calibration.

FIG. 3 illustrates an embodiment method 300 for performing IP2 calibration, as might be performed during factory calibration of a transceiver. As shown, the method 300 begins at step 310, where an IP2 calibration signal is inserted onto a transmit port of a duplexer. Thereafter, the method 300 proceeds to step 320, where a portion of the calibration signal that leaks across the receive port of the duplexer is analyzed to determine IP2 calibration parameters for the receive circuit of the transceiver.

Figure 4:
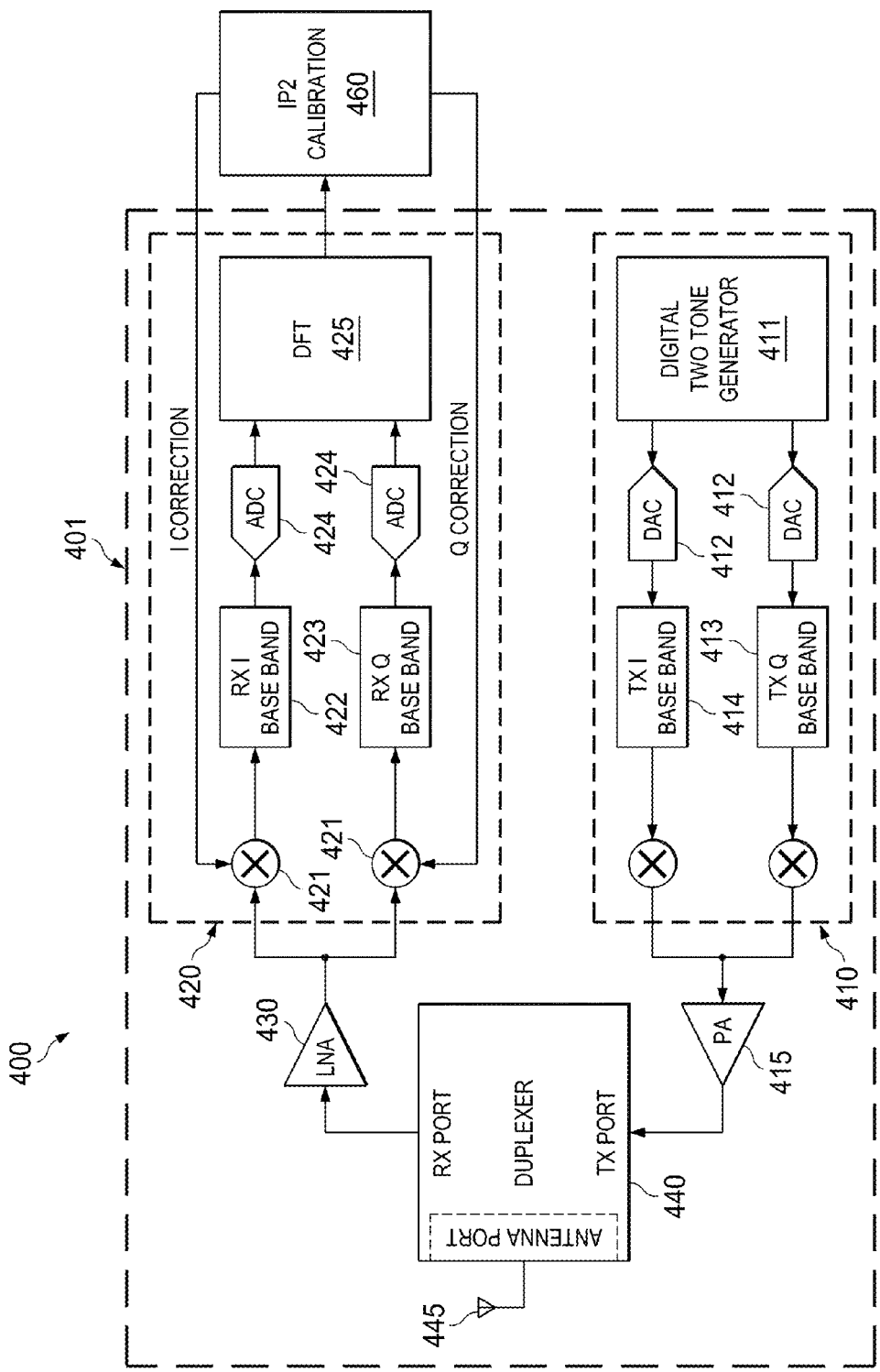
FIG. 4 illustrates a diagram of another embodiment IP2 calibration architecture.

In some embodiments, the transmit circuitry of the transceiver is used to generate the IP2 calibration signal. FIG. 4 illustrates an embodiment IP2 calibration architecture 400 including a transceiver 401 and an IP2 calibration module 460. The transceiver 401 includes a transmit circuit 410, a PA 415, a receive circuit 420, an LNA 430, a duplexer 440, and an antenna 445. The PA 415, the LNA 430, and the duplexer 440 may be configured similarly to like components of the transceiver 101. The transmit circuit 410 includes a digital two tone generator 411, a pair of DACs 412, a quadrature-phase base band modulator 413, and an in-phase base band modulator 414. The digital two tone generator 411 is configured to generate a two tone digital signal. The DACs 412 are configured to convert the two tone digital signal into an analog signal. The in-phase base band modulator 413 and the quadrature-phase base band modulator 414 are configured to up-convert the analog baseband signal into a RF signal.

Figure 5:
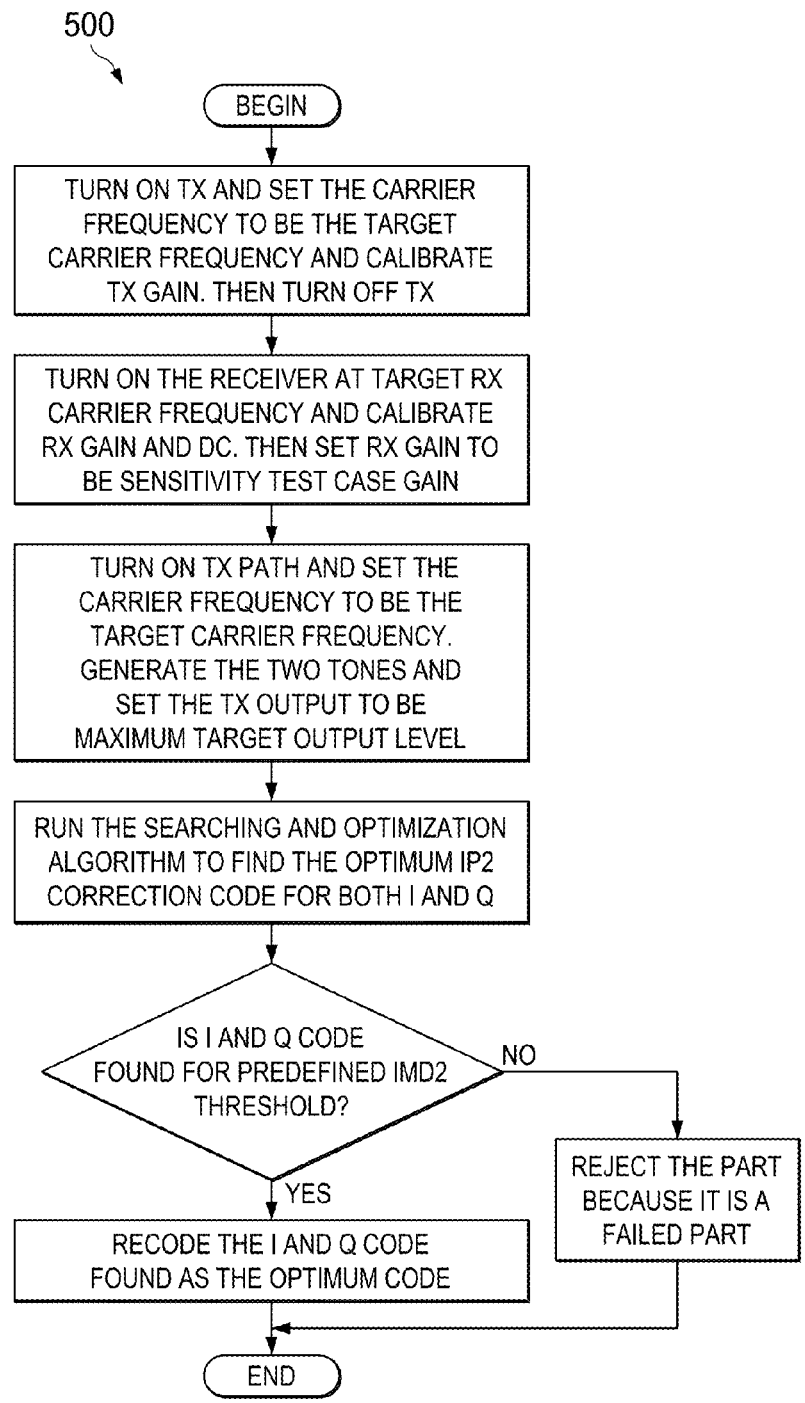
FIG. 5 illustrates a flowchart of another embodiment method for performing IP2 calibration.

The receive circuit includes mixers 421, an in-phase base band demodulator 422, a quadrature-phase base band demodulator 423, a pair of ADCs 424, a discrete Fourier transform (DFT) module 425. The in-phase base band demodulator 422 and the quadrature-phase base band demodulator 423 are configured to down-convert the received RF signal into an analog baseband signal. The ADCs 424 are configured to convert the analog signal into a digital signal. The DFT module 425 is configured to perform Fourier analysis on the digital signal to measure the IMD2 signal, which is forwarded to the IP2 calibration module for processing. The IP2 calibration module processes the IMD2 signal to produce an IP2 correction code having an in-phase correction (I-correction) component and a quadrature-phase correction (Q-correction) component. FIG. 5 illustrates a method 500 for performing IP2 calibration in accordance with the embodiment IP2 calibration architecture 400, as might be performed during factory IP2 calibration.

Another shortcoming of conventional factory IP2 calibration is the reliance on a strict binary search when analyzing the received calibration signal. More specifically, the strict binary search alternates between an in-phase correction (I-correction) component search and a quadrature-phase correction (Q-correction) component search, while evaluating only a single set of component values (e.g., a low, a mid, a high) during each search iteration. The strict binary search becomes susceptible to finding a local maximum, rather than a global maximum, by only evaluating a single set of component values (e.g., a low, a mid, and a high) during early iterations of IP2 calibration. This concept is explained in greater detail by the charts depicted in FIGS. 6-8.

Figure 6:
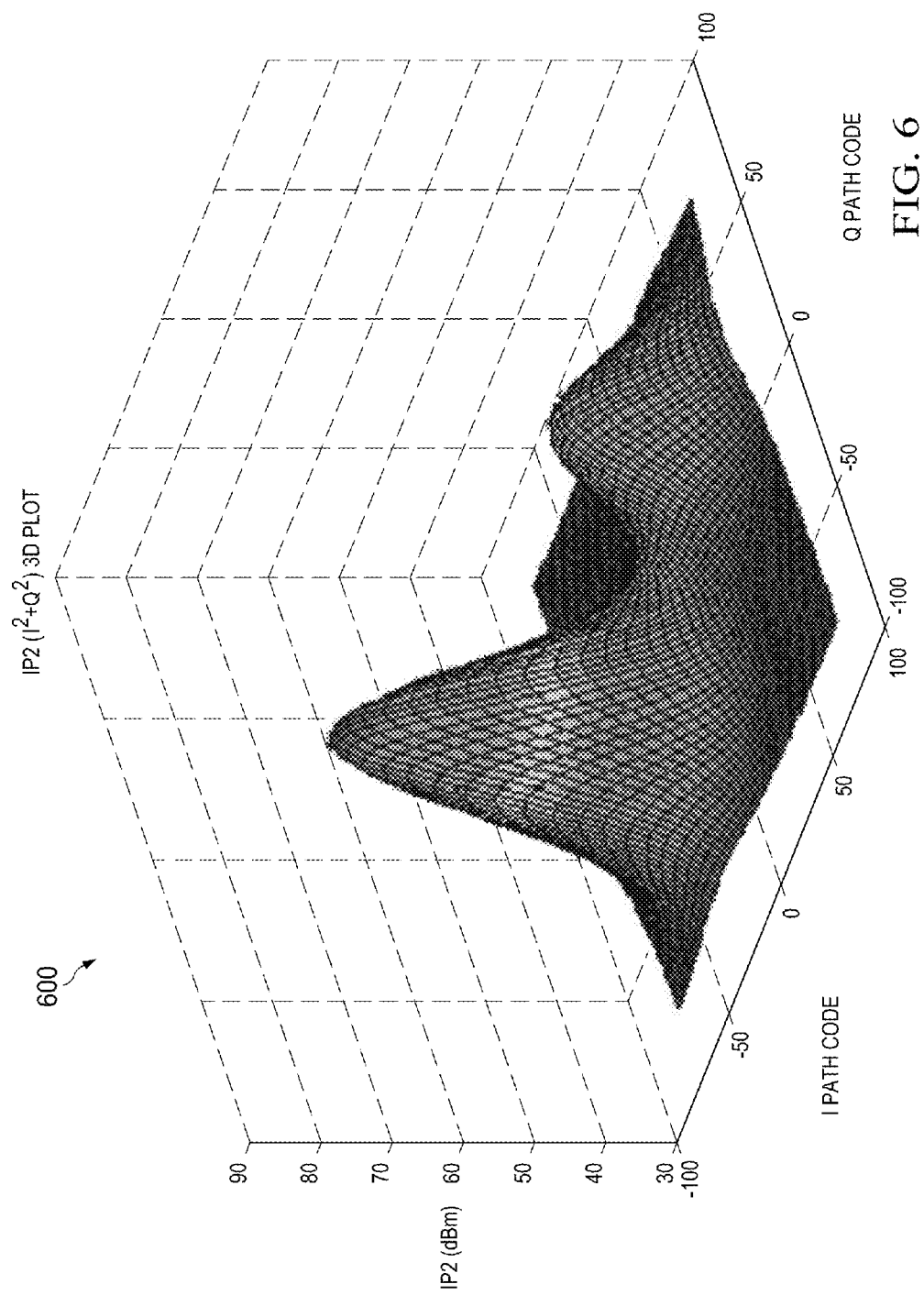
FIG. 6 illustrates a three-dimensional diagram of an IMD2 signal.
Figure 7:
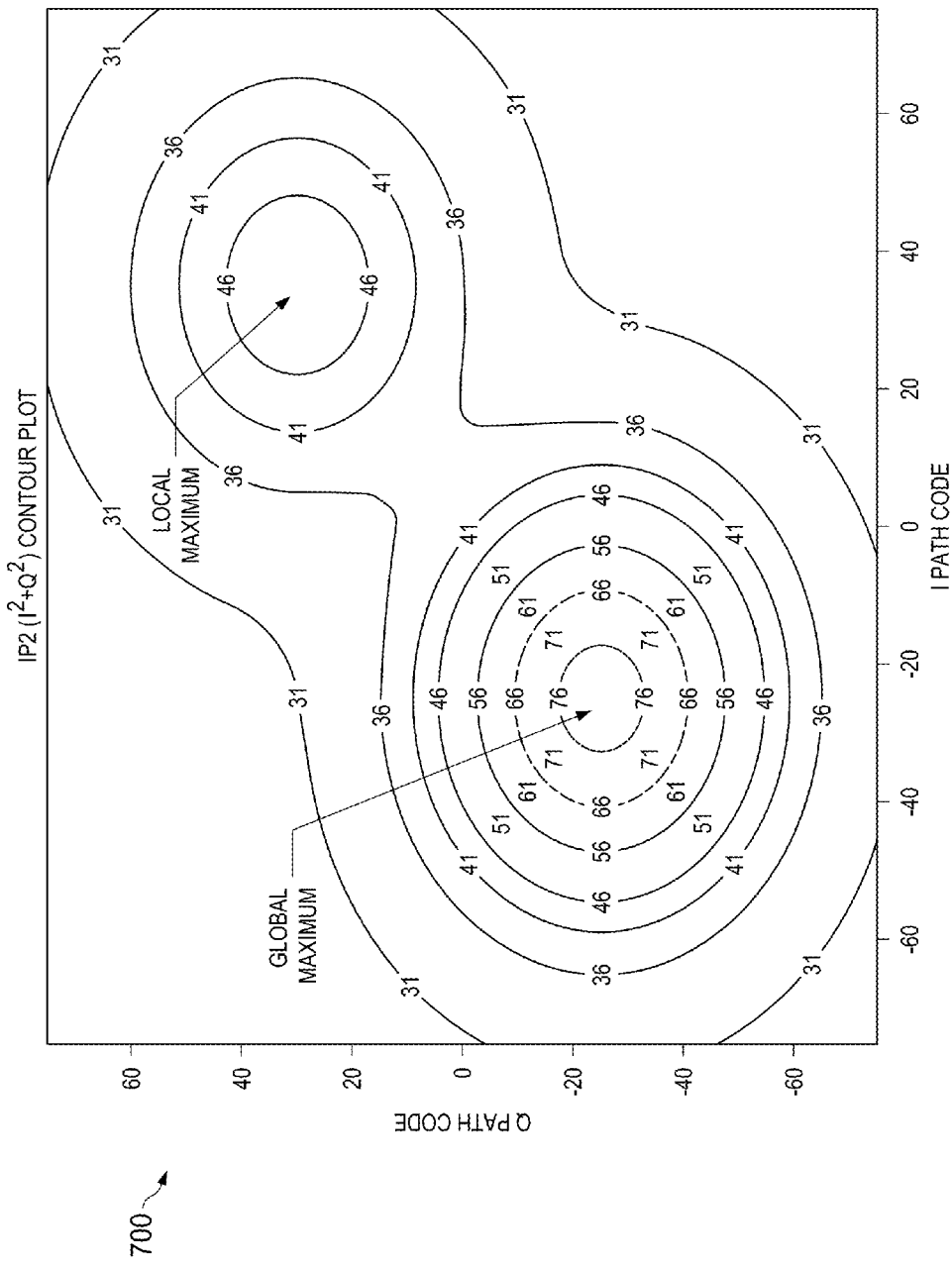
FIG. 7 illustrates a diagram of a contour plot of an IMD2 signal.

FIG. 6 illustrates a three dimensional (3D) plot 600 of an IMD2 signal. As shown, the IP2 value (i.e., the y-axis) is a function of the I-correction code and the Q-correction code. FIG. 7 illustrates a contour plot 700 of the IMD2 signal depicted in FIG. 6. As shown, the contour plot 700 has a global maximum and a local maximum. As described below, the conventional strict binary search is susceptible to finding the local maximum, while the binary-like search ensures (or at least makes it more likely) that the global maximum will be found.

Figure 8A:
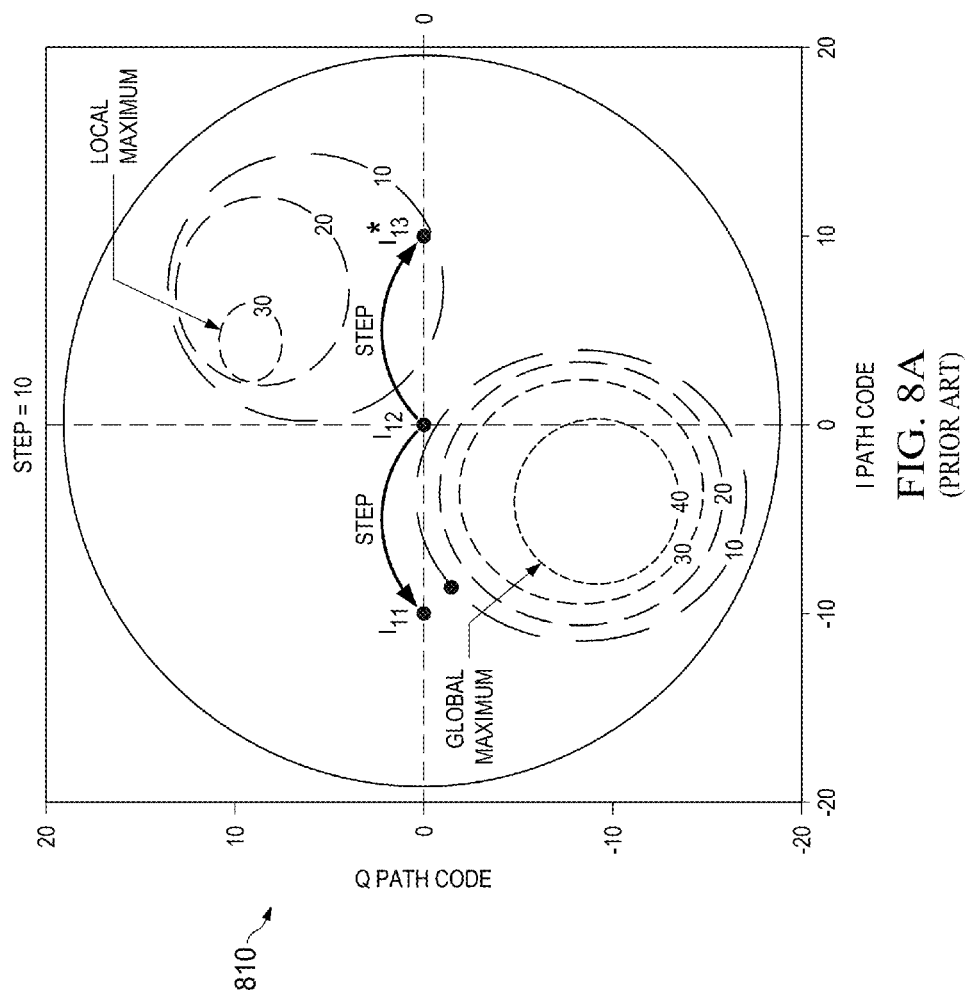

FIGS. 8A-8F depict iterations 810-830 of a strict binary search, as may commonly be performed during conventional IP2 factory calibration. In this example, the initial starting point is set at (0,0) on the I-Q plane and the initial step size is set at 10. FIG. 8A illustrates an I-component search of a first iteration 810, where the strict binary search evaluates three I-component values along a fixed Q-component path (Q-correction is fixed at Q=0). More specifically, the first iteration 810 sets a mid I-component value ($I_{12}$) at the starting point (0,0), and then steps ten units in either direction along the fixed Q-component path to obtain a low I-component value ($I_{11}$) and a high I-component value ($I_{13}$). Accordingly, the I-component search of the first iteration 810 evaluates three points on the I-Q plane, namely ($I_{11}$) (−10,0); $I_{12}$=(0,0); and $I_{13}$=(10,0). As shown, $I_{13}$ has an IP2 value between ten and twenty, while $I_{11}$ and $I_{12}$ both have IP2 values less than ten. As such, the I-component search of the first iteration 810 selects $I_{13}$ as the starting value of the Q-component search of the first iteration 810.

Figure 8B:
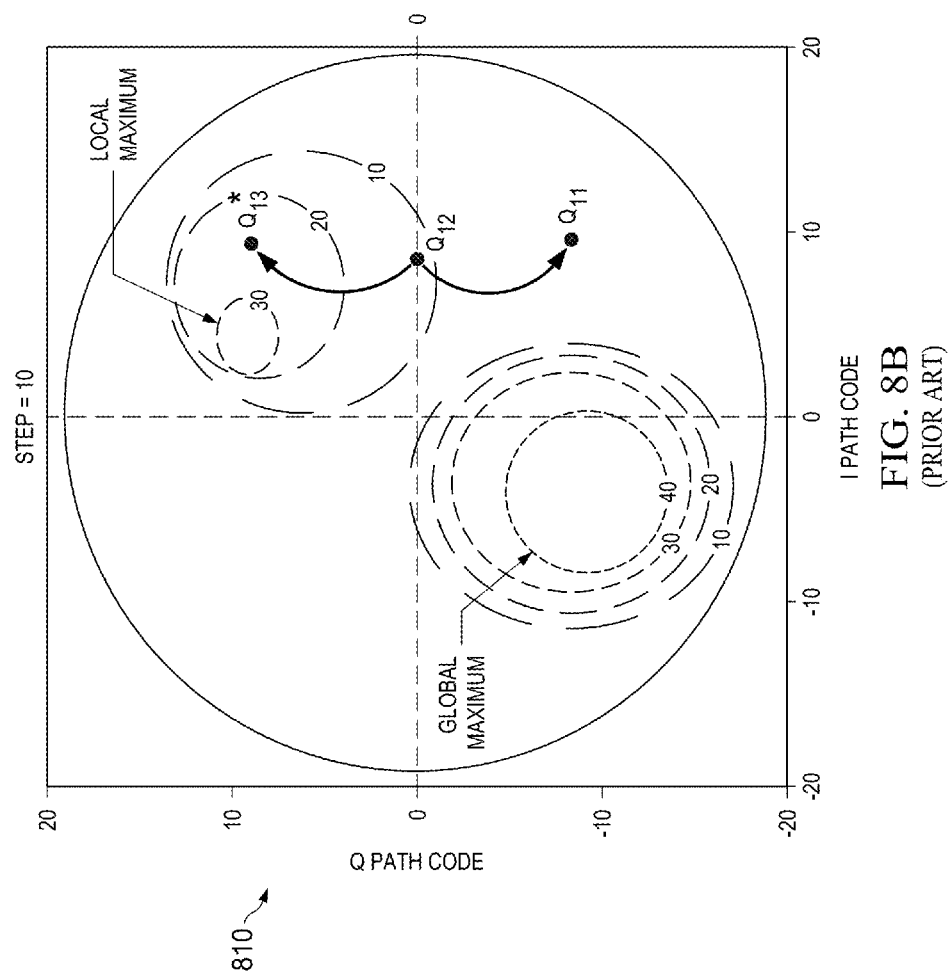

FIG. 8B illustrates the Q-component search of the first iteration 810, where the strict binary search evaluates three Q-component values along a fixed I-component path (I-correction is fixed at I=10). As shown, the Q-component search of the first iteration 810 sets a mid Q-component value ($Q_{12}$) at (10,0) on the I-Q plane, and then steps ten units in either direction along the fixed I-component path to obtain the low Q-component value ($Q_{11}$) and the high Q-component value ($I_{13}$). Accordingly, the Q-component search of the first iteration 810 evaluates three points on the I-Q plane, namely $Q_{11}$=(10,−10); $Q_{12}$=(10,0); and $Q_{13}$=(10,10). As shown, $Q_{13}$ has an IP2 value between twenty and thirty, while $Q_{11}$ and $Q_{12}$ both have IP2 values less than twenty. Accordingly, the first iteration 810 selects $Q_{13}$ as the starting value for the second iteration 820, and the step size is decremented from ten to five after the first iteration 810.

Figure 8C:
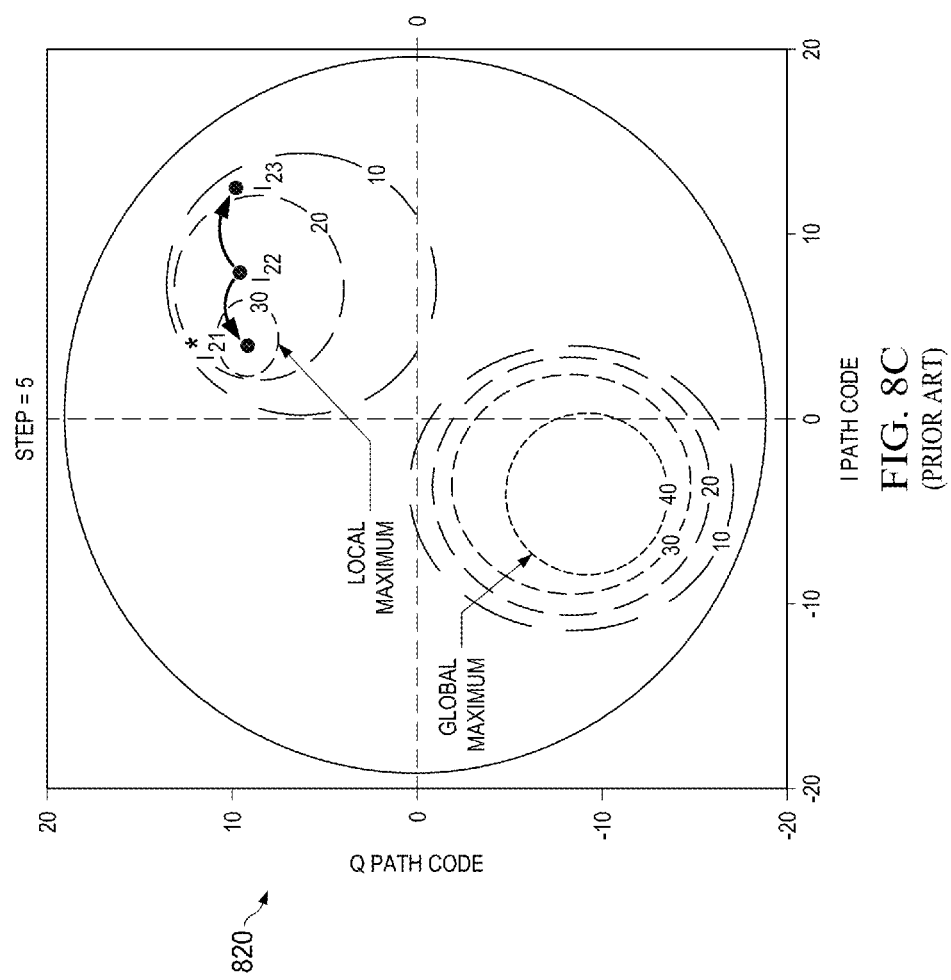

FIG. 8C illustrates an I-component search of the second iteration 820, which starts with an initial point determined by $Q_{13}$ and a step value of five. Hence, the I-component search of the second iteration 820 sets a mid I-component value ($I_{22}$) at the starting value (10,10), and then steps five units in either direction along the fixed Q-component path to obtain a low I-component value ($I_{21}$) and a high I-component value ($I_{23}$). Accordingly, the I-component search of the second iteration 820 evaluates three points on the I-Q plane, namely $I_{21}$=(5,10); $I_{22}$=(10,10); and $I_{23}$=(15,10). As shown, $I_{21}$ has an IP2 value over thirty, while $I_{22}$ and $I_{23}$ both have IP2 values less than thirty. Accordingly, the I-component search of the second iteration 820 selects $I_{21}$ as the starting value for the Q-component search of the second iteration 820.

Figure 8E:
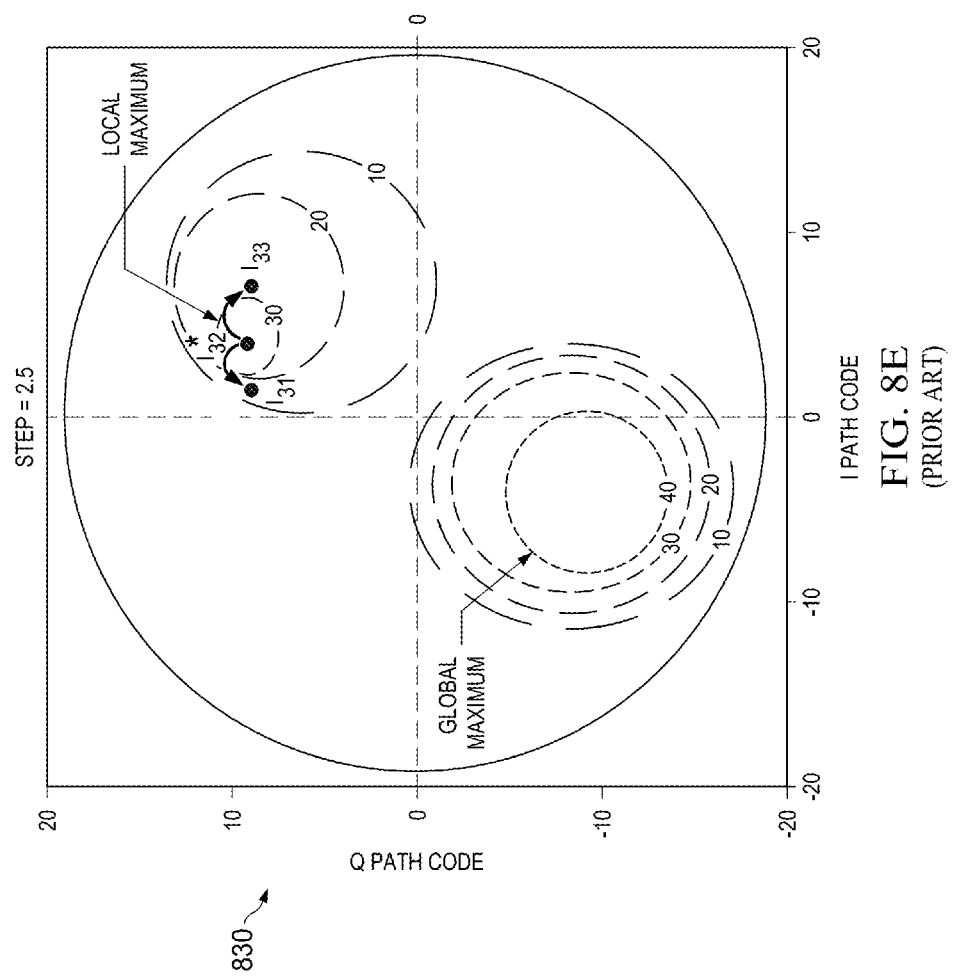
Figure 8F:
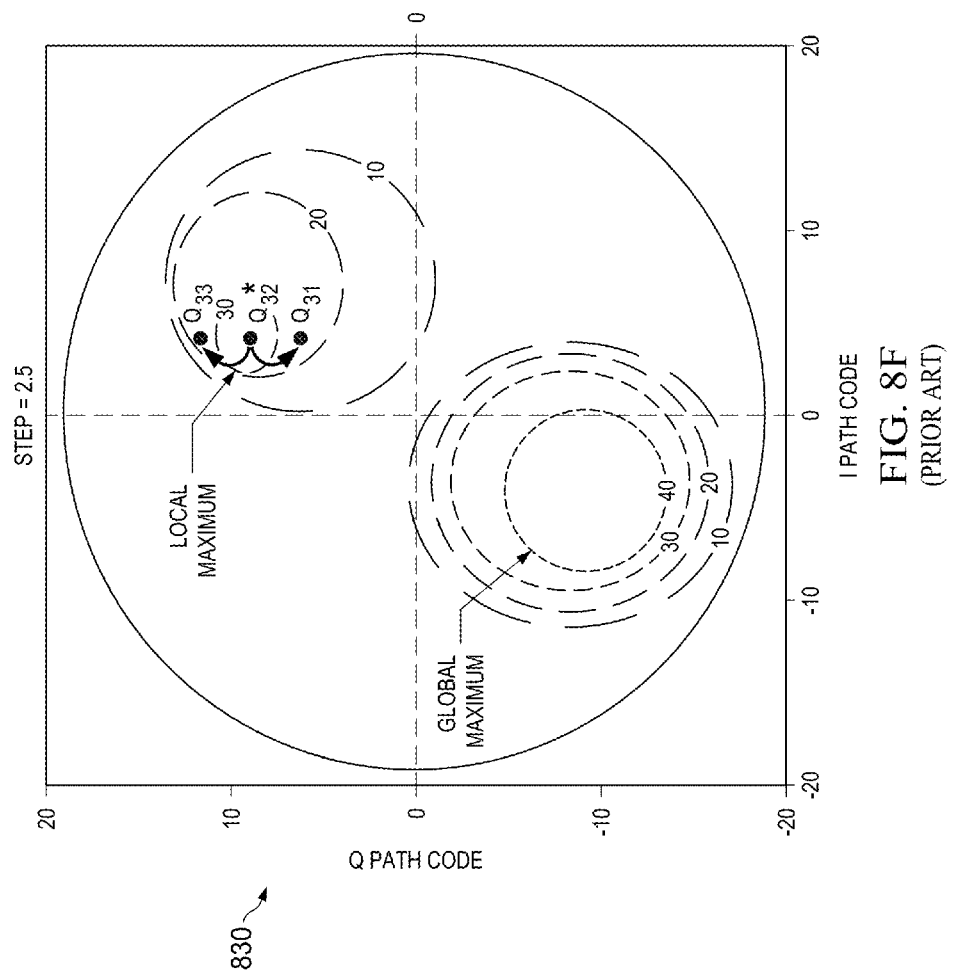

FIG. 8D illustrates the Q-component search of the second iteration 820, where the strict binary search evaluates three Q-component values along a fixed I-component path (I=5). As shown, the Q-component search of the second iteration 820 evaluates three points on the I-Q plane, namely $Q_{21}$=(5,5); $Q_{22}$=(5,10); and $Q_{23}$=(5,15). As shown, $Q_{22}$ has the highest IP2 value, and is therefore selected as the starting value for the third iteration 830. The step size is further decremented from five to two and one-half between the second iteration 820 and the third iteration 830. FIGS. 8E and 8F illustrate a third iteration 830, which considers a set of I-component values ($I_{31}$, $I_{32}$, $I_{33}$) as well as a set of Q-component values ($Q_{31}$, $Q_{32}$, $Q_{33}$). As shown, the conventional strict binary search eventually locks on to the local maximum at or around (5,10).

Figure 9A:
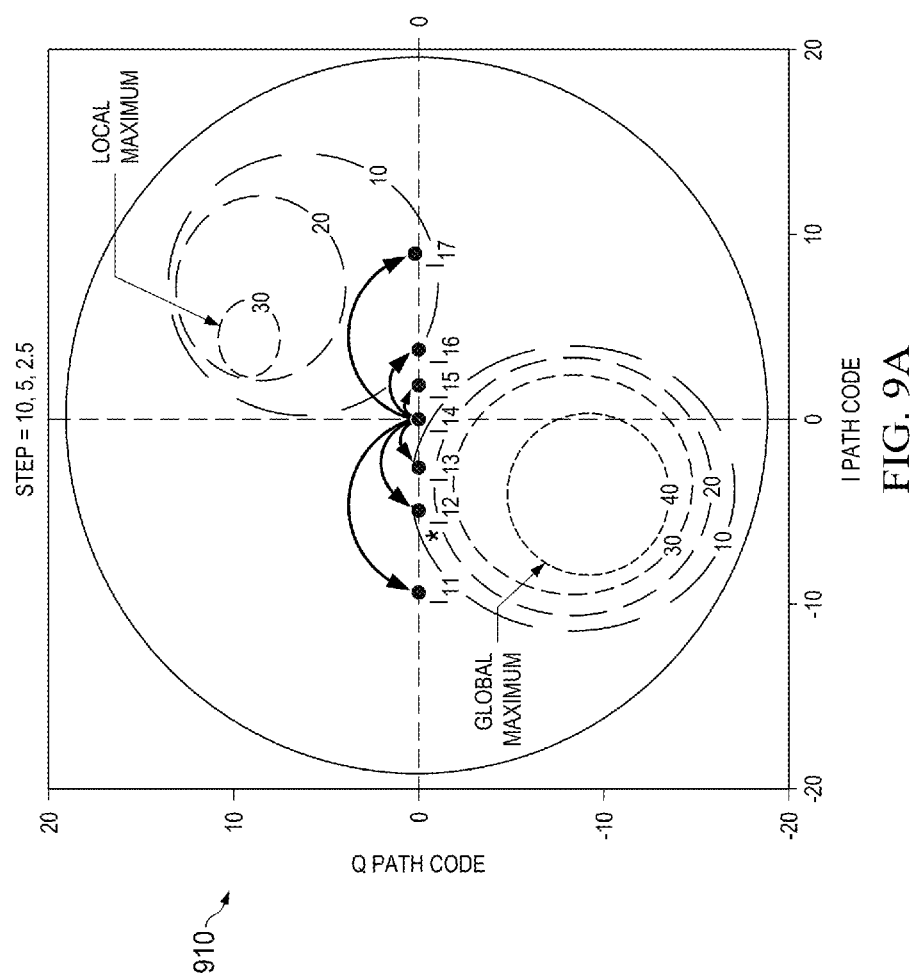
FIGS. 9A-9F illustrate diagrams of component searches during an embodiment binary-like search.

Aspects of this disclosure provide a binary like search that increases the likelihood of finding the global maximum when compared to the strict binary search described above. FIGS. 9A-9F depict iterations 910-930 of a binary-like search, as might be performed in accordance with embodiments of this disclosure. FIG. 9A illustrates an I-component search of the first iteration 910, where the binary-like search evaluates seven I-component values along a fixed Q-component path (Q-correction is fixed at Q=0). The seven I-component values are derived from step values of 10, 5, and 2.5, which extend from the initial starting point ($I_{11}$). Hence, the I-component search of the first iteration 910 evaluates seven points on the I-Q plane, namely $I_{11}$=(−10,0); $I_{12}$=(−5,0); $I_{13}$=(−2.5,0); $I_{14}$=(0,0); $I_{15}$=(2.5,0); $I_{16}$=(5,0); and $I_{17}$=(10,0). As shown, $I_{12}$ has the highest IP2 value, and is therefore selected as an initial starting point for the Q-component search of the first iteration 910.

Figure 9B:
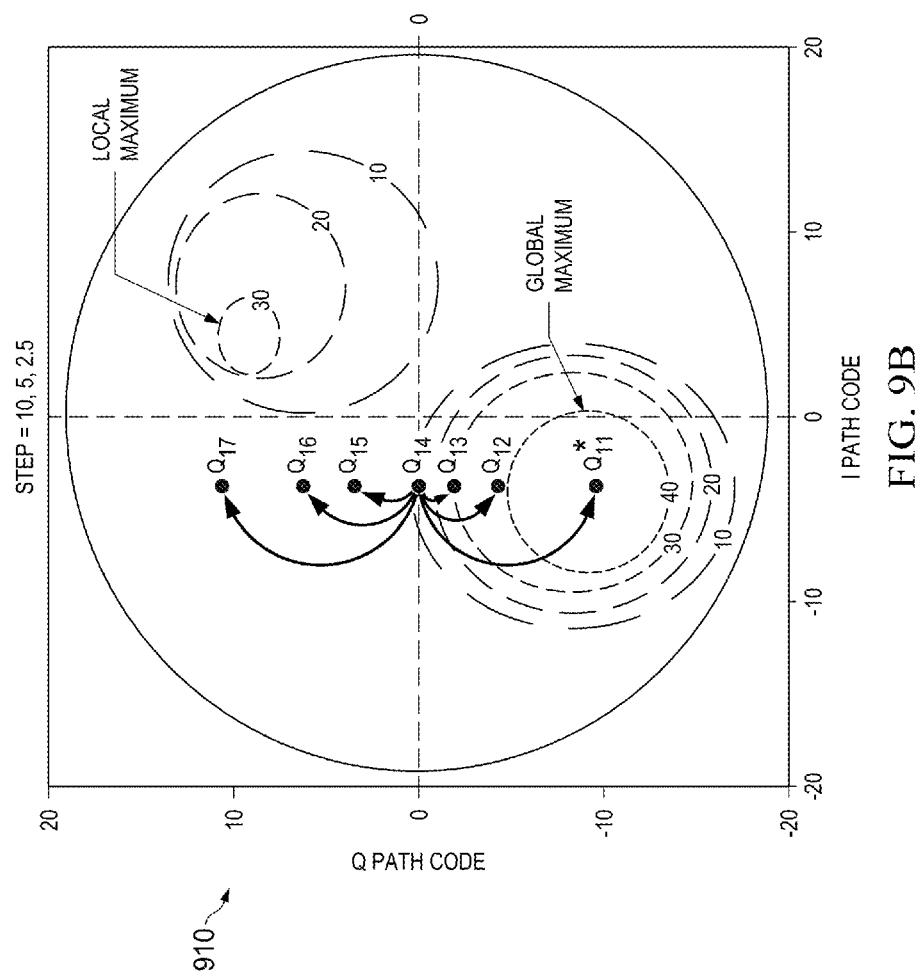

FIG. 9B illustrates the Q-component search of the first iteration 910 of the binary-like search, which evaluates seven Q-component values along a fixed I-component path (I-correction is fixed at I=−5). The step values are maintained at 10, 5, and 2.5, which yields seven points on the I-Q plane, namely $Q_{11}$=(−5,−10); $Q_{12}$=(−5,−5); $Q_{13}$=(−5,−2.5); $Q_{14}$=(−5,0); $Q_{15}$=(−5,2.5); $Q_{16}$=(−5,5); and $Q_{17}$=(−5,10). As shown, $Q_{11}$ has the highest IP2 value, and is therefore selected as an initial starting point for the second iteration 920. In some embodiments, the IP2 value of $Q_{11}$ may exceed a IMD2 threshold, in which case the binary-like search will conclude with the IP2 code set at (−5,−5). This will allow the subsequent iterations 920-930 to be skipped, thereby decreasing the time and/or resources needed to perform IP2 calibration. If the binary-like search proceeds to the second iteration 920, then the maximum step size is decremented from ten to five.

Figure 9C:
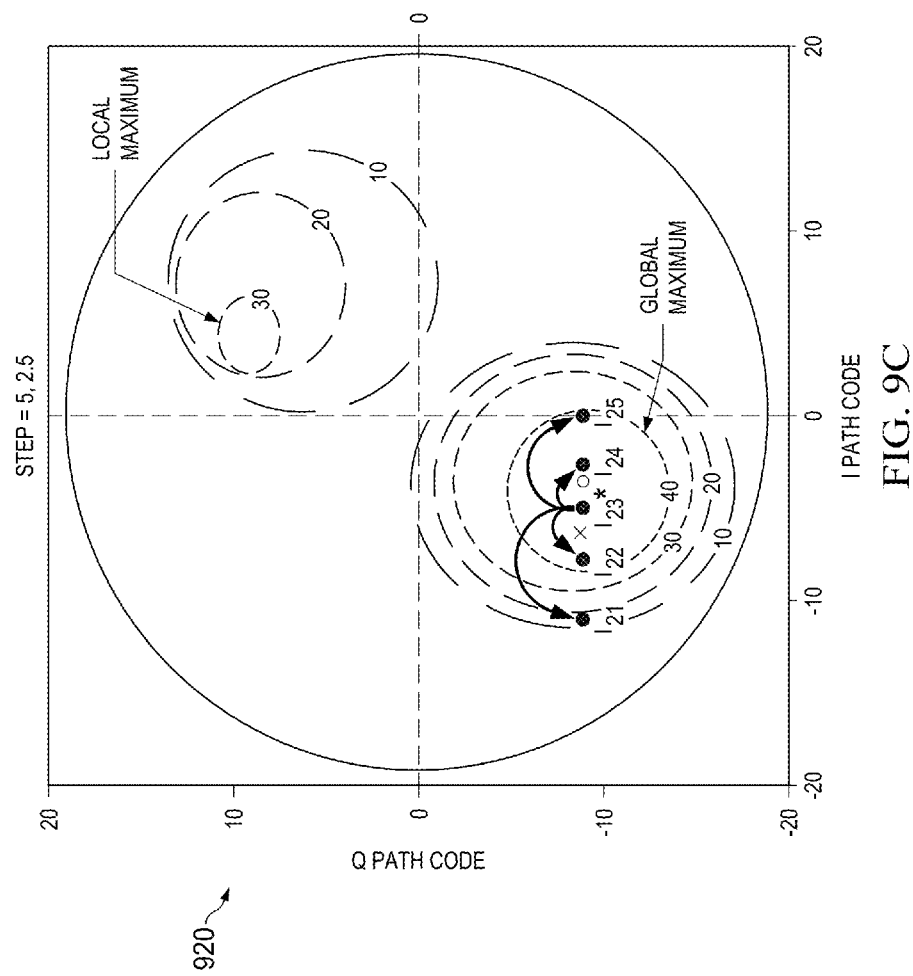
Figure 9D:
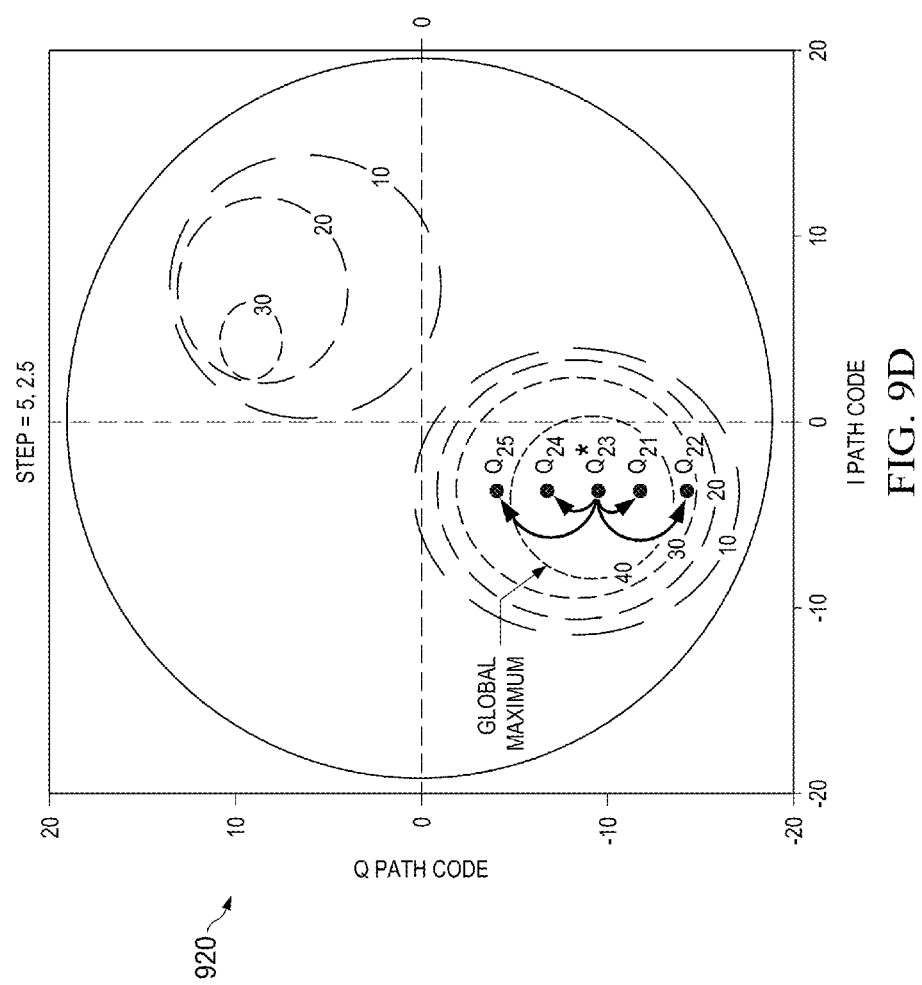
Figure 9E:
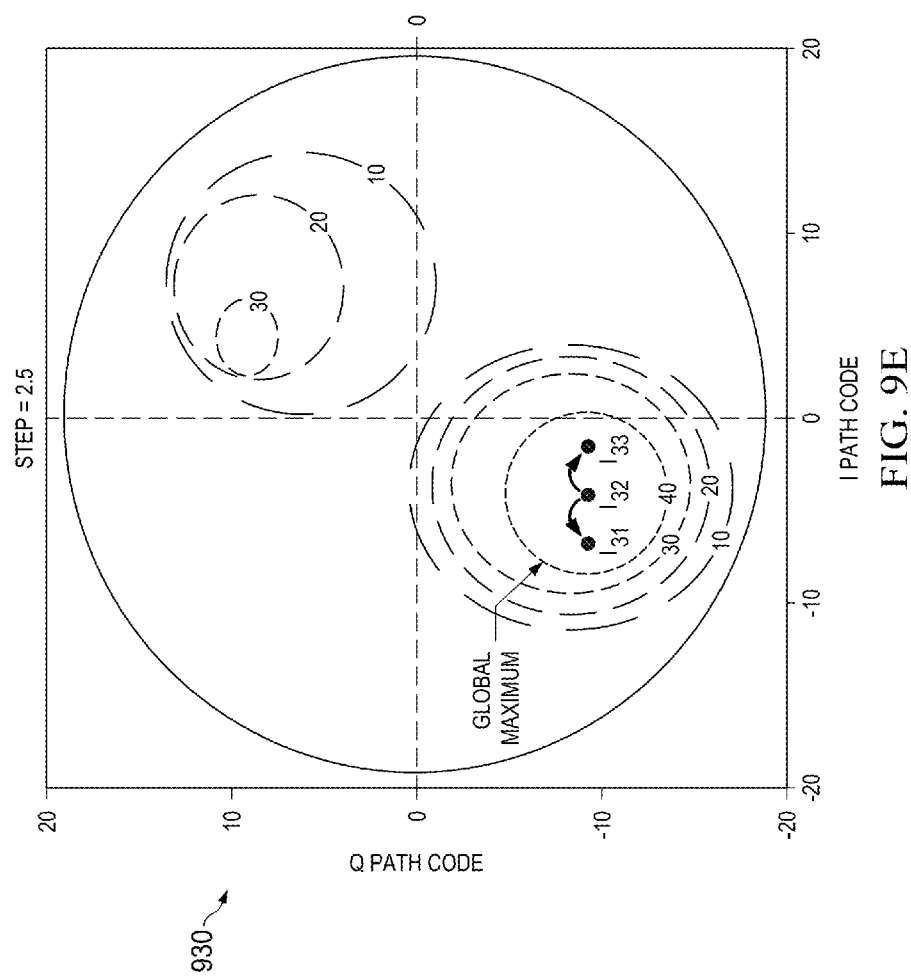
Figure 9F:
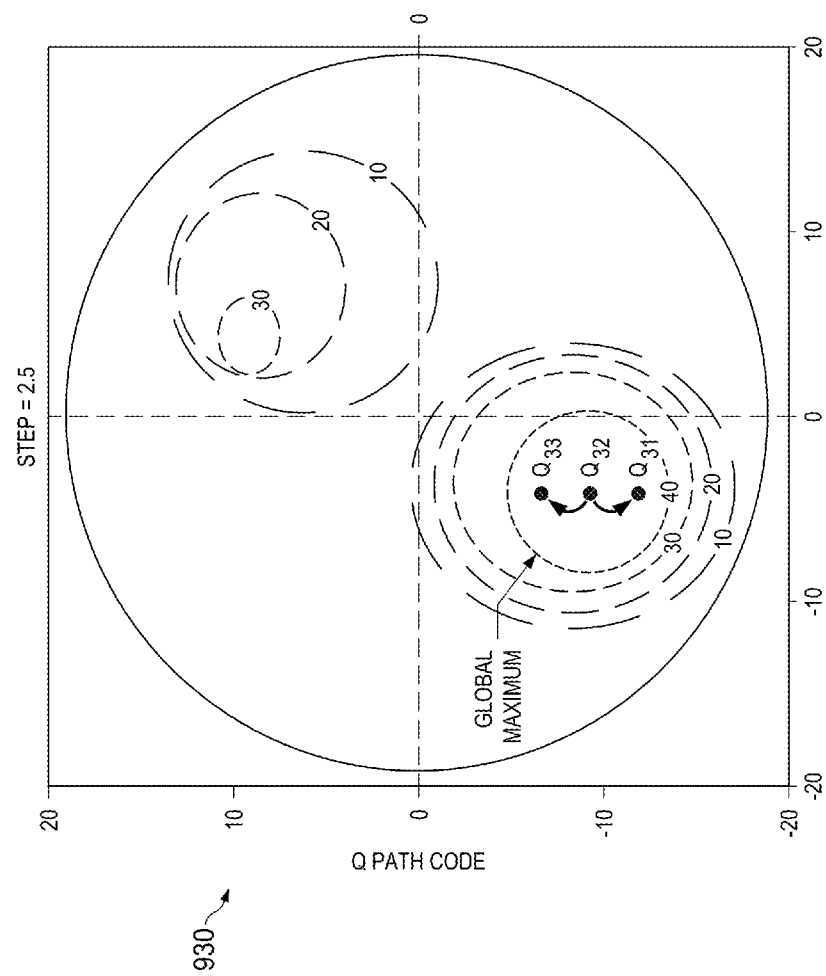

FIG. 9C illustrates an I-component search of the second iteration 920, which evaluates five points on the I-Q plane, namely $I_{21}$=(−10, −5); $I_{22}$=(−7.5,−5); $I_{23}$=(−5,−5); $I_{24}$=(−2.5, −5); and $I_{25}$=(0, −5). As shown, $I_{23}$ has the highest IP2 value, and is therefore selected as an initial starting point for the Q-component search of the second iteration 920. FIG. 9D illustrates the Q-component search of the second iteration 920, which evaluates five points on the I-Q plane, namely $Q_{21}=(-5, -10)$; $Q_{22}=(-5,-7.5)$; $Q_{23}=(-5,-5)$; $Q_{24}=(-5, -2.5)$; and $Q_{25}=(-5,0)$. As shown, $Q_{23}$ has the highest IP2 value, and therefore would ordinarily be selected as an initial starting point for the I-component search of the third iteration 930. However, in this instance, the center value did not change, and therefore the component searches of the third iteration 930 would evaluate duplicative points from the second iteration 920, e.g., $I_{22}$-$I_{24}$=$I_{32}$-$I_{34}$; $Q_{22}$-$Q_{24}$=$Q_{32}$-$Q_{34}$. Nevertheless, the I-component and Q-component searches the third iteration 930 are depicted in FIGS. 9E-9F for purposes of completeness. As shown, the maximum step value is reduced from 5 to 2.5 such that the points $I_{32}$, $I_{33}$, $I_{34}$, $Q_{32}$, $Q_{32}$, $Q_{34}$ are evaluated, with the points $I_{33}$ and $Q_{33}$ ultimately being selected.

Figure 10:
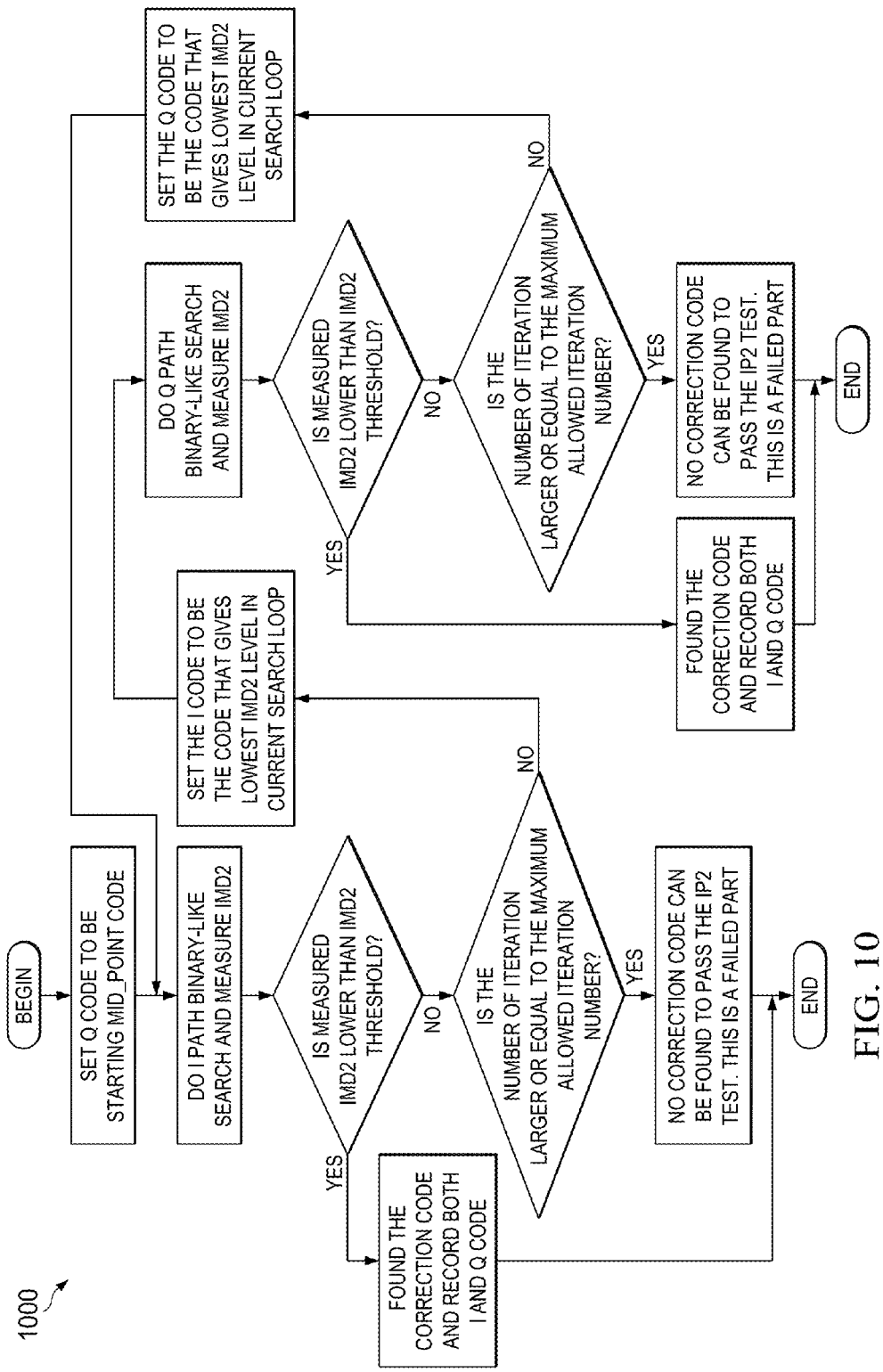
FIG. 10 illustrates a flowchart of an embodiment method for performing a binary-like search.

FIG. 10 illustrates a flow chart of a method 1000 for performing a binary-like search, as might be performed by a manufacturing device in a factory setting. FIG. 11 illustrates how a method 1100 for performing a Q-component or I-component search during an iteration of the binary-like search, and depicts how each of the different evaluation points are reached. The binary-like search can be relied upon regardless of where the calibration signal is inserted, and therefore can be used in implementations that insert the calibration signal directly onto the receive circuit as well as embodiment implementations in which the calibration signal is passed through the duplexer.

The present invention provides an effective way to calibrate second order intercept point (IP2) for a mobile device receiver (RX). By generating two tones in the transmitter (TX) path and running the transceiver in a normal operation condition, the two tone signal will leak over to the receiver through the duplexer and act as the test signal. Because the receiver is also running under normal operating conditions, it will down-convert the two tone signal and create second order inter modulation distortion (IMD2). A single point Digital Fourier Transformation (DFT) block is used to measure the IMD2 level. While adjusting the IP2 correction code on the receiver, a dynamic search and optimization algorithm is used to minimize the IMD2 level, thus, calibrate receiver IP2.

Aspects of this disclosure improve calibration accuracy as well as reduce the time/resources required to perform IP2 calibration. During calibration, a transmitter may operate at the max output power, while the receiver operates at sensitivity gain setting. This may simulate the worst scenario in the field, e.g., the mobile device is at the edge of the cell and TX is at max and the signal to be received is at sensitivity level. The test two tones may be generated in the digital base band and run through the TX chain. The two test tone will leak to LNA input at the duplexer due to finite isolation between duplexer TX and RX port. This leakage mechanism may simulate real world operation.

For a differential RX port duplexer, the leaked TX signal will show up on "+" port and "−" port and the level on "+" port may not necessarily be the same as the "−" port. This asymmetrical behavior will impact the overall receiver IP2. By using the leaked TX signal, the test tone may also naturally have this asymmetry phenomenon between "+" path and "−" path, therefore the calibration process can be at least partially optimized. Single point Digital Fourier Transformation (DFT) may be used to estimate an IMD2 level when the TX frequency synthesizer and RX frequency synthesizer use the same reference clock. This may help to ensure the IMD2 tone is located precisely at the predefined two test tone spacing location in frequency domain.

Aspects of this disclosure reduce calibration time and cost. In some embodiments, the calibration algorithm only calibrates the receiver to the point that is "good enough", which can save calibration time. In some conventional implementations, IP2 calibration is performed to tune the receiver to be as good as possible which may take a relatively long time. However there may be diminished returns when the IP2 calibration exceeds a certain threshold, e.g., further improvement on IP2 calibration does not significantly improve RX sensitivity. Several factors may impact the overall IP2 correction code searching time. Duplexer isolation may affect searching time since the test tone is generated through the duplexer TX to RX port limited isolation. It is possible to take the advantage of the duplexer isolation effect, e.g., if the duplexer has high isolation the test tone will be weak at LNA input and generate small IMD2 distortion and require less time to calibrate. Another factor is IP2 starting point of the receiver without calibration.

Oftentimes, IMD2 correction has the IQ dependent behavior, meaning that the correction made on the I-path will impact both I and Q paths, while the correction made on Q-path will also impact both I and Q paths. Embodiments of this disclosure use the amplitude of I+jQ IMD2 (e.g., $I^2+Q^2$) as the calibration criteria. The two dimension (both I and Q) search algorithm will iterate between I path and Q path while monitoring the $I^2+Q^2$ IMD2 level in order to find the optimum correction code.

In some embodiments, algorithms may use the predetermined RX gain compensated threshold level to dynamically adjust the number of searches needed to achieve the final target based on duplexer isolation performance and starting point of the receiver IP2 level. This predetermined RX gain compensated threshold level is used as a criterion to determine if the IMD2 is low enough. Mobile devices may have either high enough IP2 or high enough duplexer isolation to start with, and consequently may require relatively short calibration periods. In a typical production batch, relatively few mobile devices with process corner transceiver or duplexer will require long calibration time. Hence, calibration time may be reduced in a statistical sense.

In some embodiments, a maximum number of iterations may be set to ensure that the longest calibration time is set to a limit. This maximum number of iteration value can provide the tradeoff between the average calibration time and product yield. Because both calibration time and yield costs money, by optimizing the maximum iteration value, lower costs can be achieved.

A binary-like search may be used to speed up the search process. In general, the binary-like search may measure three points of IMD2. After finding the best code, shift the center to the best code and reduce the step by factor of 2. Repeat the process until step reaches 1.

In some embodiments, the binary-like search may start with ¼ of the overall calibration code range to step value. The benefit of doing this is to deal with the scenario of not well behaved IMD2 vs. IP2 correction code. For example, if there is a local optimum code, instead of finding the local optimum spot, the search gives a chance to reach the global optimum spot.

The following references are related to this disclosure, and are incorporated herein by reference as if reproduced in their entities: U.S. Patent Application Publication 2012/0077452 entitled "IP2 Calibration Methods and Techniques"; U.S. Pat. No. 8,238,860 entitled "Tuning a Second Order Intercept Point of a Mixer in a Receiver"; U.S. Pat. No. 8,121,571 entitled "Method for Second Intercept Point Calibration Based on Opportunistic Reception"; and U.S. Pat. No. 8,060,043 entitled "Adaptive IP2 Calibration."

FIG. 12 illustrates a block diagram of an embodiment manufacturing device 1200, which may be used to perform one or more aspects of this disclosure. The manufacturing device 1200 includes a processor 1204, a memory 1206, and a plurality of interfaces 1210-1212, which may (or may not) be arranged as shown in FIG. 12. The processor 1204 may be any component capable of performing computations and/or other processing related tasks, and the memory 1206 may be any component capable of storing programming and/or instructions for the processor 1204. The interface 1210-1212 may be any component or collection of components that allows the device 1200 to communicate control instructions to other devices, as may be common in a factory setting.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for second order intercept point (IP2) calibration of a wireless transceiver, the method comprising:
    transmitting, by an independent IP2 signal generator coupled between a transmit port of a duplexer and a power amplifier in a transmit circuit of the wireless transceiver, a calibration signal directly into and over the transmit port of the duplexer, wherein the duplexer comprises a receive port coupled to a receive circuit of the wireless transceiver and the transmit port coupled to the transmit circuit of the wireless transceiver, the calibration signal being a known signal specifically configured to obtain IP2 calibration parameters for the receive circuit of the wireless transceiver, and the independent IP2 signal generator being separate and distinct from the wireless transceiver, and wherein a portion of the calibration signal leaks from the transmit port to the receive port of the duplexer and propagates over the receive circuit; and
    analyzing the portion of the calibration signal that leaks from the transmit port to the receive port of the duplexer to determine the IP2 calibration parameters for the receive circuit of the wireless transceiver.

2. The method of claim 1, wherein the calibration signal is a two-tone calibration signal.

3. The method of claim 1, wherein the calibration signal is an analog calibration signal.

4. The method of claim 3, wherein the transmit port of the duplexer is coupled to a transmit circuit, the transmit circuit comprising a digital to analog converter (DAC).

5. The method of claim 4, wherein transmitting the calibration signal over the transmit port of the duplexer comprises:
    generating a two-tone digital signal; and
    transmitting the two-tone digital signal over the transmit circuit, wherein the DAC converts the two-tone digital signal into the analog calibration signal.

6. The method of claim 1, wherein the portion of the calibration signal is down-converted by the receive circuit, the down-converting creating second order intermodulation distortion (IMD2) signal.

7. The method of claim 6, wherein analyzing the portion of the calibration signal to determine the IP2 calibration parameters comprises:
    analyzing the IMD2 signal to determine the IP2 calibration parameters.

8. The method of claim 7, wherein analyzing the IMD2 signal to determine the IP2 calibration parameters comprises:
    analyzing the IMD2 signal in accordance with a binary-like search to determine the IP2 calibration parameters.

9. An apparatus comprising:
    at least one processor; and
    a non-transitory computer readable storage medium storing programming for execution by the at least one processor, the programming including instructions to:
    transmit, via an independent second order intercept point (IP2) signal generator, coupled between a transmit port of a duplexer and a power amplifier in a transmit circuit of a wireless transceiver, a calibration signal directly into and over the transmit port of the duplexer, wherein the duplexer comprises a receive port coupled to a receive circuit of the wireless transceiver and the transmit port coupled to a transmit circuit of the wireless transceiver, the calibration signal being a known signal specifically configured to obtain second order intercept point (IP2) calibration parameters for the receive circuit of the wireless transceiver, and the independent IP2 signal generator being separate and distinct from the wireless transceiver, and wherein a portion of the calibration signal leaks from the transmit port to the receive port of the duplexer and propagates over the receive circuit; and
    analyze the portion of the calibration signal that leaks from the transmit port to the receive port of the duplexer to determine the IP2 calibration parameters for the receive circuit of the wireless transceiver.

10. The apparatus of claim 9, wherein the calibration signal is a two-tone calibration signal.

11. The apparatus of claim 9, wherein the calibration signal is an analog calibration signal.

12. The apparatus of claim 11, wherein the transmit port of the duplexer is coupled to a transmit circuit, the transmit circuit comprising a digital to analog converter (DAC).

13. The apparatus of claim 12, wherein the instructions to transmit the calibration signal over the transmit port of the duplexer includes instructions to:
    generate a two-tone digital signal; and
    transmit the two-tone digital signal over the transmit circuit, wherein the DAC converts the two-tone digital signal into the analog calibration signal.

14. The apparatus of claim 9, wherein the portion of the calibration signal is down-converted by the receive circuit, the down-converting creating second order intermodulation distortion (IMD2) signal.

15. The apparatus of claim 14, wherein the instructions to analyze the portion of the calibration signal to determine the IP2 calibration parameters include instructions to:
    analyze the IMD2 signal to determine the IP2 calibration parameters.

16. The apparatus of claim 15, wherein the instructions to analyze the IMD2 signal to determine the IP2 calibration parameters include instructions to:

analyze the IMD2 signal in accordance with a binary-like search to determine the IP2 calibration parameters.

17. A system adapted to perform second order intercept point (IP2) calibration of a wireless transceiver, the system comprising:

an IP2 signal generator coupled between a transmit port of a duplexer and a power amplifier in a transmit circuit of the wireless transceiver, the IP2 signal generator configured to transmit a calibration signal directly into and over the transmit port of the duplexer, the calibration signal being a known signal specifically configured to obtain IP2 calibration parameters for a receive circuit of the wireless transceiver, the IP2 signal generator being separate and distinct from the wireless transceiver;

a receive port coupled to a receive circuit of the wireless transceiver, the receive port configured to a receive a portion of the calibration signal that leaks from the transmit port to a receive port of the duplexer and propagates over the receive circuit; and at least one processor configured to analyze the portion of the calibration signal that leaks from the transmit port to the receive port of the duplexer to determine the IP2 calibration parameters for the receive circuit of the wireless transceiver.

18. The system of claim 17, wherein the IP2 signal generator and the at least one processor are part of a test circuit.

19. The system of claim 17, wherein the IP2 signal generator is also connected to an output node of a power amplifier that is further configured to receive an outgoing signal produced by a transmit path of the wireless transceiver.

20. The system of claim 17, wherein the IP2 signal generator, the at least one processor, and the wireless transceiver are part of a single device.

* * * * *